UNITED STATES PATENT OFFICE.

ISIDOR TRAUBE AND RICHARD WOLFFENSTEIN, OF BERLIN, GERMANY, ASSIGNORS TO ROBERT C. SCHÜPPHAUS, OF NEW YORK, N. Y.

SOLUTION OF FERRIC QUINATE AND ALBUMEN.

No. 839,232. Specification of Letters Patent. Patented Dec. 25, 1906.

Application filed February 15, 1906. Serial No. 301,317.

*To all whom it may concern:*

Be it known that we, ISIDOR TRAUBE and RICHARD WOLFFENSTEIN, subjects of the King of Prussia, German Emperor, residing at Berlin, in the Kingdom of Prussia and German Empire, have invented new and useful Improvements for the Solution of Ferric Quinate and Albumen, of which the following is a specification.

Many iron preparations produce indigestion for reasons not accounted for. When we consider that ferric chlorid is a styptic and that the trivalent iron ion is a precipitant of colloids, we are led to the hypothesis of ascribing this indigestion to the precipitation of colloids in the stomach and intestines, presumably in combination with iron. The examination of numerous commercial preparations confirmed this supposition throughout. The greater the number of iron ions that could be detected by means of ferrocyanid the more copious the precipitate of albumen and similar bodies and the less digestible the preparation, as proved by clinical experiments. Quinic acid and its compounds were found to possess the property of dissolving the colloidal precipitates produced by ferric ions, as well as of preventing their formation when used in suitable proportions. If a few drops of a ten-per-cent. aqueous solution of ferric quinate are added to pure egg albumen, no precipitate is formed. A few drops of a ten-per-cent. solution of ferric chlorid cause the same quantity of egg albumen to curdle completely. In other words, no precipitation ensues when iron and quinic acid are present in the proportion of their molecular weights. Hence our new iron compounds contain at least a quantity of quinic acid sufficient to prevent the precipitation of colloids. Its action on the body being beneficent, there can be no objection to its presence. The iron is present as ion, as in aqueous solutions of ferric chlorid, ferric quinate, and similar iron salts. These compounds are essentially different from such preparations as elixir chinæ ferratum, which are chiefly quinin mixtures and being mostly alcoholic extracts could hardly contain appreciable quantities of quinic acid, owing to the slight solubility of the salts of quinic acid in alcohol.

The ferrated albumen and peptone compounds of more recent origin are undoubtedly more digestible; yet they also do not contain iron ions. There can be no doubt that compounds easily yielding iron ions present the iron in a form that is more readily assimilated.

We employ, preferably, our iron compounds in conjunction with albuminous substances. For the first time we have liquid preparations containing simple iron salts together with dissolved albumen or similar bodies.

A solution embodying our invention may be prepared by saturating an aqueous solution of fifty grams of quinic acid with the equivalent quantity of ferric hydrate, preferably freshly made by precipitating a ferric-chlorid solution with sodium carbonate. To this the whites of six eggs and one hundred and fifty grams of cane-sugar are added and the whole concentrated to two hundred and seventy-five grams. Thus a stock solution suitable for dispensing purposes is obtained containing twenty per cent. of ferric quinate. The equivalent weight of ferric hydrate is 9.29 grams. The concentration is carried on below $56°$ centigrade, preferably *in vacuo* or in a current of an inert gas. Or instead of dissolving ferric hydrate in quinic acid (hydrogen quinate) a soluble iron salt, such as ferric chlorid, may be acted upon by sodium quinate. The viscous fluid of dark color contains albumen and iron in solution, not in a state of mutual combination.

What we claim as our invention, and desire to secure by Letters Patent, is—

1. The process of obtaining a stable solution containing an organic colloid and an iron salt which consists in combining the solution of said colloid with an iron compound and a quinate.

2. As a new article of manufacture a stable viscous solution, of dark color, containing an organic colloid and an iron compound not chemically combined, and a quinate.

In testimony whereof we have signed our names to this specification in the presence of two subscribing witnesses.

ISIDOR TRAUBE.
RICHARD WOLFFENSTEIN.

Witnesses:
HENRY HASPER,
WOLDEMAR HAUPT.